United States Patent [19]

Brunemann, Jr. et al.

[11] Patent Number: 5,469,447
[45] Date of Patent: Nov. 21, 1995

[54] APPARATUS FOR SELECTING A VALID SIGNAL FROM A PLURALITY OF REDUNDANT MEASURED AND MODELLED SENSOR SIGNALS

[75] Inventors: George A. Brunemann, Jr., Cincinnati; Paul R. Reismiller, West Chester, both of Ohio

[73] Assignee: General Electric Company, Cincinnati, Ohio

[21] Appl. No.: 331,294

[22] Filed: Oct. 28, 1994

Related U.S. Application Data

[63] Continuation of Ser. No. 248,849, May 25, 1994, abandoned, which is a continuation of Ser. No. 699,065, May 13, 1991, abandoned.

[51] Int. Cl.⁶ .............................. G06F 11/08; G06F 15/40
[52] U.S. Cl. .................................. 371/36; 371/681
[58] Field of Search .......................... 371/36, 15.1, 68.1, 371/68.3, 67.1, 5.1

[56] References Cited

U.S. PATENT DOCUMENTS

| | | | |
|---|---|---|---|
| 3,551,776 | 12/1970 | Tawfik | 348/564 |
| 3,681,578 | 8/1972 | Stevens | 371/36 |
| 3,805,235 | 4/1974 | Foster et al. | 371/36 |
| 3,851,157 | 11/1974 | Ellis | 235/150.1 |
| 3,881,670 | 5/1975 | Doniger | 371/36 |
| 3,895,223 | 7/1985 | Neurer et al. | 235/153 AE |
| 4,225,961 | 9/1980 | Raggenbass et al. | 371/36 |
| 4,276,648 | 6/1981 | Tomlinson | 371/68 |
| 4,472,806 | 9/1984 | Blair . | |
| 4,497,059 | 1/1985 | Smith | 371/36 |
| 4,566,101 | 6/1986 | Skonieczny et al. | 371/5 |
| 4,622,667 | 11/1986 | Yount | 371/9 |
| 4,680,216 | 7/1987 | Linsenmayer | 364/516 |
| 4,697,098 | 9/1987 | Cloke | 307/354 |
| 4,709,376 | 11/1987 | Kage | 375/58 |
| 4,761,748 | 8/1988 | Le Rat et al. | 364/551 |
| 4,866,712 | 9/1989 | Chao | 371/5.1 |
| 4,916,612 | 4/1990 | Chin et al. | 364/424.01 |
| 5,001,638 | 3/1991 | Zimmerman et al. | 364/424.06 |
| 5,111,458 | 5/1992 | Hara | 371/16.5 |
| 5,111,460 | 5/1992 | Botzenhardt | 371/29.1 |

FOREIGN PATENT DOCUMENTS

| | | | |
|---|---|---|---|
| 0315227 | 10/1989 | European Pat. Off. . | |
| 1597318 | 5/1988 | United Kingdom | G05B 9/03 |

OTHER PUBLICATIONS

Upadyaya et al., "An Integrated Architecture for Signal Validation in Power Plants", 1989 IEEE, '88 Intelligent Control Symp., pp. 681–686.

*Primary Examiner*—Robert W. Beausoliel, Jr.
*Assistant Examiner*—Joseph E. Palys
*Attorney, Agent, or Firm*—Andrew C. Hess; Patrick R. Scanlon

[57] ABSTRACT

The present invention provides a method and an apparatus for selecting a valid signal from a plurality of redundant sensor signals wherein the sensor signals may include a plurality of measured and modelled signals. The invention comprises a circuit for generating a plurality of first pass/fail signals by performing a series of tests on the sensor signals. The invention further comprises circuitry for assigning a plurality of weighted values to each of the measured sensor signals according to the first and second pass/fail signals wherein the second pass/fail signals are initialized as pass signals. The invention further comprises of circuitry for summing the weighted values for each measured sensor signal and generating second pass/fail signals for each measured sensor signal. The invention also includes circuitry for assigning selection flags to each sensor signal according to the first and second pass/fail signals and circuitry for selecting the valid signal from the selection flags.

6 Claims, 2 Drawing Sheets

5,469,447

APPARATUS FOR SELECTING A VALID SIGNAL FROM A PLURALITY OF REDUNDANT MEASURED AND MODELLED SENSOR SIGNALS

The U.S. Government has rights in this invention pursuant to contract F33657-83-C-0281 awarded by the United States Air Force. This application is a Continuation of application Ser. No. 08/248,849, filed May 25, 1994, which is a Continuation of application Ser. No. 07/699,065, filed May 13, 1991, now abandoned.

FIELD OF INVENTION

The present invention relates in general, to signal selection and fault detection within control systems and more particularly, to a digital control system for selecting a valid signal from two or more redundant sensors.

BACKGROUND OF THE INVENTION

In control systems, and particularly in control systems in the aviation art, redundant channel signal processing is frequently used to increase the reliability and safety of the system. In aircraft engine applications digital control systems may be used, for example, to regulate steady-state and transient power output over the available power range, to maximize engine cycle efficiency, to provide the required thrust response during power changes, and to provide stable operation under all operating conditions.

Digital control systems are trending towards the use of more sensors to improve the system's availability and performance through redundancy. To validate signals, validity tests must be performed on each sensor signal and their results must be processed by selection logic. Current systems achieve noise immunity and tolerance to intermittent failures by, for example, scattering persistence counters and latches throughout the validity tests and selection logic. Current systems may also tailor the validity logic design to the needs of each sensor. The result has been a very rapid increase in the size and complexity of the logic used to validate signals. There is a need for a signal validation strategy which can handle noise and different kinds of failures with reduced overall complexity. Furthermore, there is a need for a signal validation method flexible enough to handle various kinds of sensors.

U.S. Pat. No. 4,916,612 to Chin et al discloses an approach for providing a signal selection and fault detection system that is fail operative. In this system, the outputs from a pair of sensors are received by a midvalue selector. The midvalue selector also receives a third input that is representative of the sensed condition. In a normal mode of operation i.e., when neither of the first and second redundant input signals has failed, or is about to fail, the third input signal is produced by a normal mode complementary filter. This filter integrates a condition rate signal that is representative of the rate of change of the condition. When a failure condition occurs the output of a failure mode complementary filter is substituted for the output of the normal mode complementary filter as the third input to the midvalue selector.

While the control system described in the aforementioned patent may have been suitable for aircraft systems, it may not be suitable for other applications, e.g. aircraft engines for various reasons. Firstly, the coupling of the selection logic to the fault logic may require a redesign of the logic structure if the control system is to be used in other areas of technology. Secondly, in expanding the control system for selecting valid signals from among several sensors, i.e. three or more, the size and complexity of the logic required for the system may rapidly increase. Thirdly, the control system does not include a means for restoring a signal once it has been declared failed. Electrical failures are often temporary and the failed component may resume proper operation after failing for a short period. A fault detection method which cannot restore a signal after a fault may not regain the advantages of full redundancy when it is available.

SUMMARY OF THE INVENTION

The present invention provides an apparatus for selecting a valid signal from a plurality of redundant sensor signals wherein the sensor signals may include a plurality of measured and modelled signals. The apparatus comprises a means for generating a plurality of first pass/fail signals by performing tests on the sensor signals. The apparatus further comprises means for assigning a plurality of weighted values to each of the measured sensor signals according to the first and second pass/fail signals wherein the second pass/fail signals are initialized as pass signals. The apparatus further comprises a means for summing the weighted values for each measured sensor signal and generating second pass/fail signals for each measured sensor signal. A means for assigning selection flags to each of the sensor signal according to the first and second pass/fail signals and a means for selecting the valid signal from the selection flags are also included.

The present invention provides a method for selecting a valid signal from a plurality of redundant signals wherein the sensor signals may include a plurality of measured and modelled signals. The method comprises the steps of 1) performing a series of tests on a plurality of sensor signals to obtain first pass/fail signals for each sensor signal 2) assigning a plurality of weighted values to each measured signal according to the first and second pass/fail signals wherein the second pass/fail signals are initialized as pass signals. The method further comprises the steps of 3) summing the weighted values for each measured sensor signal and 4) generating second pass/fail signals for each measured sensor signal according to the sum of their weighted values. The method further comprises the steps of 5) assigning a plurality of selection flags according to the first and second pass/fail signals for each of the sensor signals and 6) selecting a valid signal according to the selection flags.

BRIEF DESCRIPTION OF THE DRAWINGS

The novel features of the invention are set forth with particularity in the appended claims. The invention, both as to organization and method of operation, together with further objects and advantages thereof, will be more fully understood from the following detailed description taken in conjunction with the accompanying drawings in which:

DETAILED DESCRIPTION OF THE INVENTION

Figure 1:
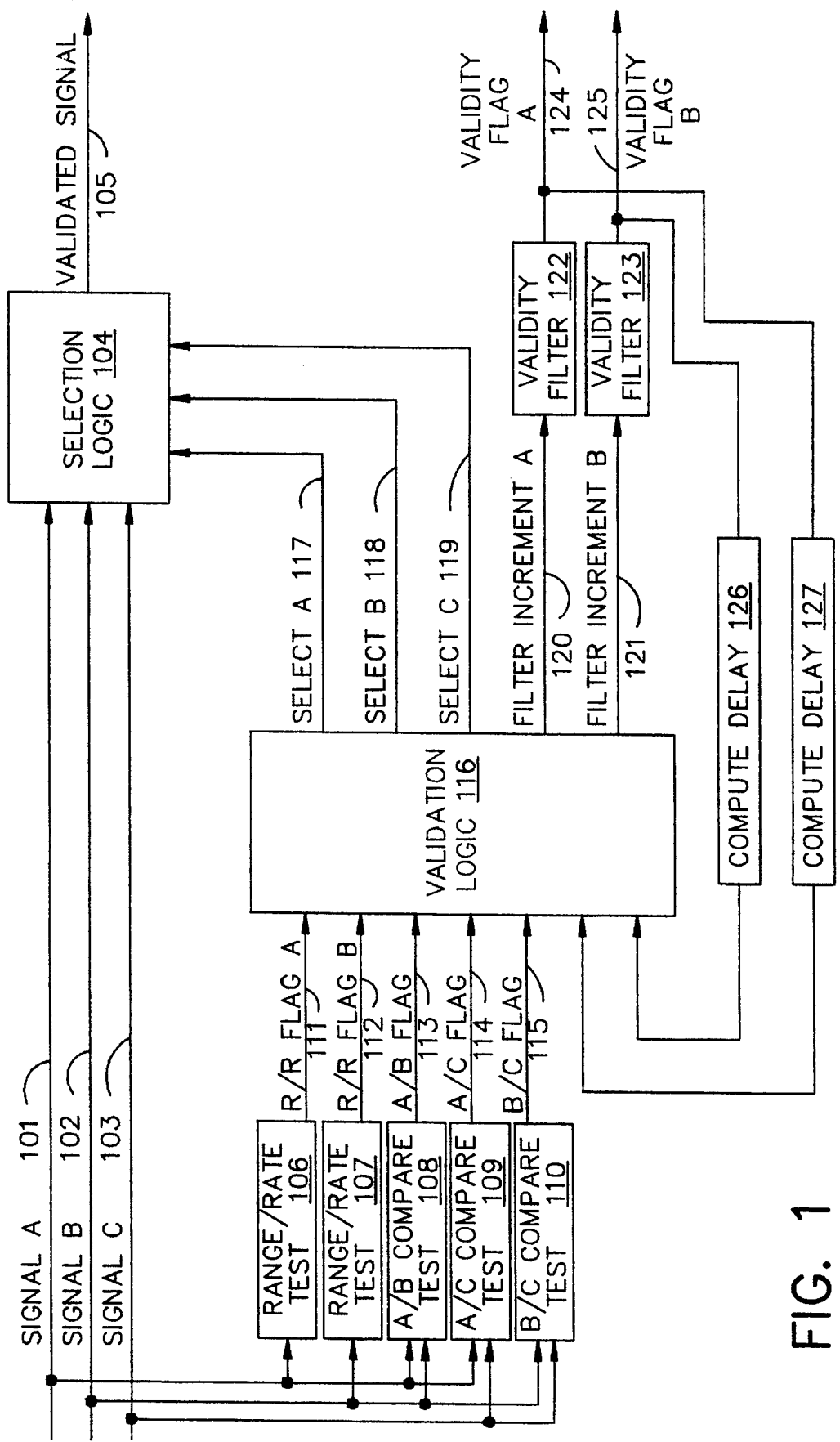
FIG. 1 is a block diagram illustrating an embodiment of the filtered signal validation apparatus according to the present invention.

FIG. 1 illustrates a block diagram of a preferred embodiment of the filtered signal validation apparatus according to the present invention. The apparatus comprises test circuits (106–110) for performing a series of tests on measured signals (101,102) and for example a modelled signal 103 to obtain first pass/fail signals (111–115). It will be apparent to those skilled in the art that signal 103 may be, for example, a third measured signal. The apparatus further comprises validation logic 116 for assigning weighted values (120,121) to each measured signal (101,102) and selection flags (117–119) to each measured signal (101,102) and modelled signal 103 according to first (111–115) and second (124,125) pass/fail signals wherein second pass/fail signals are initialized as "pass" signals (124,125). The apparatus further comprises validity filters (122,123) for summing weighted values (120,121) with previously stored weighted values (120,121) for each measured signal (101,102) wherein each validity filter (122,123) is associated with a measured signal (101,102). Second pass/fail signals (124,125) are generated by each validity filter (122,123) according to the sum of the weighted values (120,121) in each validity filter (122,123) wherein second "fail" signals (124,125) are generated when the sum of the weighted values (120,121) in each validity filter (122,123) reaches a predetermined value. The apparatus further comprises selection logic for selecting valid signal 105 according to selection flags (117–119).

In the preferred embodiment, three sensor signals are used. Two sensor signals are measured signals (101,102) while the third signal is a modelled signal 103. Test circuits (106,107) may perform range/rate tests on measured signals (101,102). Test circuits (106,107) may also include an activity test to determine whether or not measured signals (101,102) have been updated. Test circuits (108–110) may perform comparison tests to compare each measured signal (101,102) with modelled signal 103 and to compare measured signal 101 with measured signal 102. The results of the range/rate and comparison tests are pass/fail signals (111–115). Validation logic 116 assigns weighted values (120,121) to each measured signal (101,102) according to the first (111–115) and second (124,125) pass/fail signals wherein second pass/fail signals are initialized as "pass" signals. Validation logic 116 also assigns selection flags (117–119) to each measured signal (101,102) and modelled signal 103 according to the first (111–115) and second (124,125) pass/fail signals. Validity filters (122,123) sum weighted values (120,121) with previously stored weighted values (120,121) for each measured signal (101,102). Second pass/fail signals (124,125) for each measured signal (101,102) are generated by each validity filter (122,123) according to the sum of the weighted values (120,121) in each validity filter (122,123) wherein second "fail" signals (124,125) are generated when the sum of the weighted values (120,121) in each validity filter (122,123) reaches a predetermined value. Selection logic 104 selects valid signal 105 according to selection flags (117–119). Compute delays (126,127) are shown to indicate that second pass/fail signals (124,125) from the prior valid signal selection are inputted into validation logic 116. Consequently, validation logic 116 may assign selection flags (117–119) for the current valid signal selection.

As described in the aforementioned paragraphs, second pass/fail signals (124,125) are initialized as "pass" signals (124,125) and will remain in the "pass" condition until the sum of the weighted values (120,121) in the respective validity filters (122,123) reaches a predetermined value. If one of the second pass/fail signals is set to a "fail" signal it will remain in the "fail" condition until the sum of the weighted values (120,121) in the corresponding validity filter is decremented to its initial value. In this manner the present invention allows for a filtered or delayed reset of a failure condition after it has been detected.

The filtered reset feature is a result of the signal tests (106–110), the assigning of weighted values (120,121), and the summation of the weighted values in validity filters (122,123) continuing even after a fail condition has been declared by the second pass/fail signals (124,125). The total number of times a second pass/fail signal (124,125) can be restored from a "fail" to a "pass" condition is limited by the validity filters (122,123) by using counters which are incremented each time the second pass/fail signal (124,125) is restored. Thus an intermittent measured signal (101,102) which fails repeatedly in a given period of time eventually generates a latched second "fail" signal (124,125).

The present invention has an upper and lower limit on the summation of the weighted values (120,121) in validity filters (122,123). In the preferred embodiment, these limits are equal to the predetermined value at which a failure is declared and the initialized value, respectively. It would be obvious to those skilled in the art that these upper and lower limits may be assigned different values according to the particular application of the control system.

Figure 2:
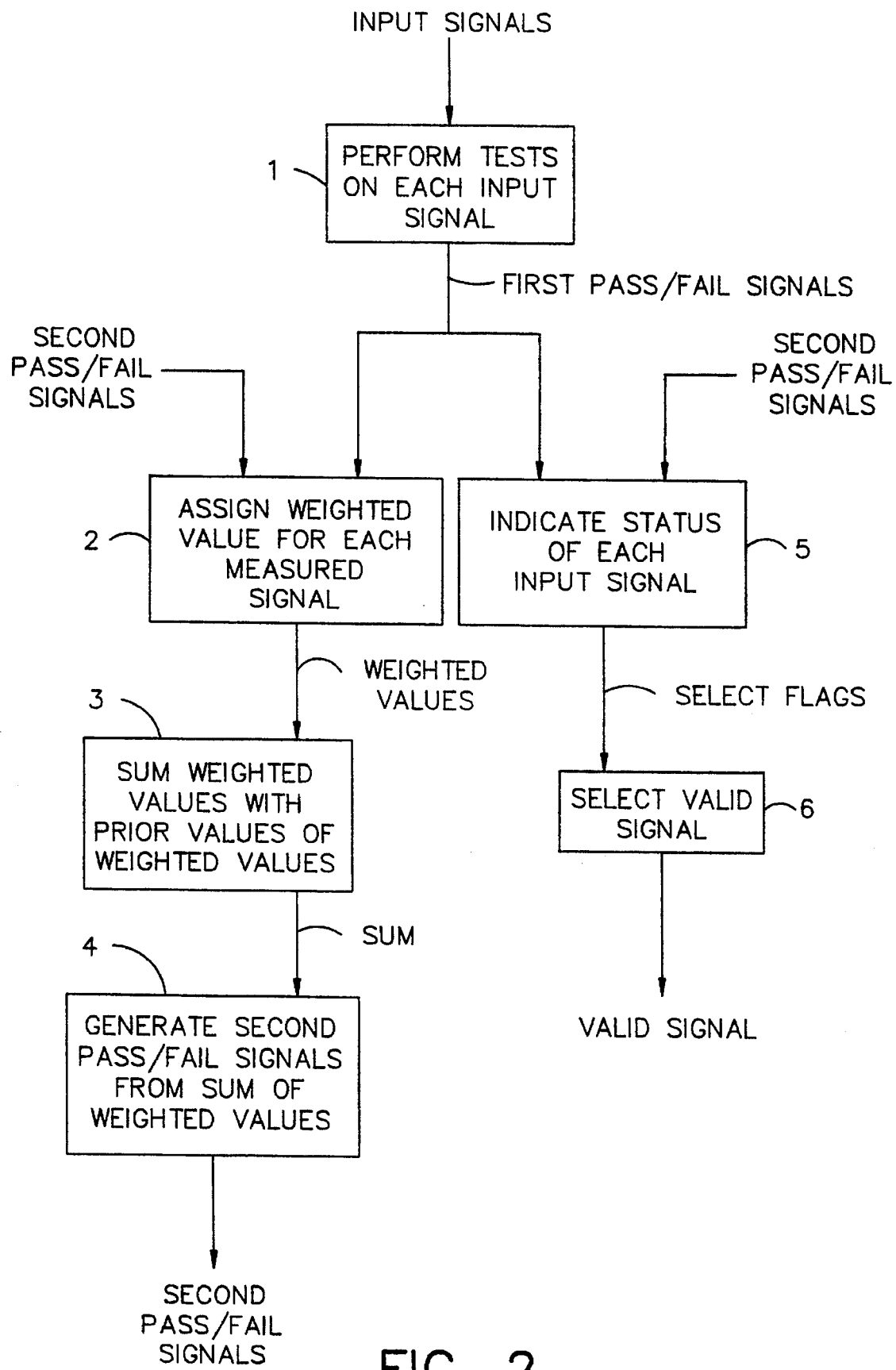
FIG. 2 is a flow chart illustrating an embodiment of the filtered signal validation method according to the present invention.

FIG. 2 illustrates a flow chart of a preferred embodiment of the filtered signal validation method according to the present invention. The method comprises the step 1 of performing a series of tests on sensor signals to obtain first pass/fail signals and the step 2 of assigning weighted values to each sensor signal according to first and second pass/fail signals wherein second pass/fail signals are initialized as "pass" signals. The method further comprises the step 3 of summing weighted values for each sensor signal with previously assigned weighted values and the step 4 of generating second pass/fail signals according to the sum of the weighted values for each sensor signal. The method further comprises the step 5 of assigning selection flags for each sensor signal according to the first and second pass/fail signals and the step 6 of selecting a valid signal according to selection flags.

In the preferred embodiment second "fail" signals are generated when the sum of the weighted values for the corresponding sensor reaches an upper limit. Second "pass" signal are generated when the sum of the weighted values for the corresponding sensor reaches a lower limit. These limits are equal to the predetermined value at which a failure is declared and the initialized value, respectively. The total number of times a second pass/fail signal can be restored from a "fail" to a "pass" condition is limited and thus, an intermittent measured signal which fails repeatedly in a given period of time eventually generates a latched second "fail" signal.

The present invention thus provides a method and an apparatus for selecting a valid signal from a plurality of redundant sensor signals. The invention may be easily modified to accommodate different sensor types and different amounts of sensor signals. For example, for a triplex redundant system, the modelled signal may be a third sensor. Thus, extra signal tests and an extra validity filter may be added. For larger multiredundant systems several extra signal tests maybe added to the control system. However, for each added measured signal one validity filter may added to the control system for the expansion.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

We claim:

1. An apparatus for selecting a valid signal from among a plurality of redundant sensor signals comprising:

a plurality of rate/range test circuits for receiving a first measured signal input and outputting a respective ranger/rate flag;

a plurality of comparison signal test circuits for comparing said first measured signal input to a modeled signal input and for outputting a respective first comparison flag;

a plurality of comparison signal test circuits for comparing said first measured input signal to a second measured input signal, and for outputting a respective second comparison flag;

a plurality of validity filters, each having as an input a filter increment signal, and each outputting a respective validity flag; and validation logic for receiving as inputs said validity flags, said range/rate flags, and said first second comparison flags, and for providing as outputs a plurality of selection flags each selected according to a weighted value of said range/rate flags, said comparison flags, and said validity flags, and for generating a plurality of measured filter increment signals each having a magnitude and sign according to the weight value of said range/rate flags, said comparison flags, and said validity flags where the most negative value represents a valid measured signal and the most positive value represents an invalid measuredsignal.

2. An apparatus according to claim 1, wherein:

said validity filter logic comprises means for summing each current filter increment input value to the previously stored filter increment value.

3. The apparatus according to claim 2, wherein said validity filter logic further comprises;

means for initially setting said validity flags to pass state;

means for setting said validity flag to an invalid state when said summed value reaches an upper limit;

means for resetting said validity flag to a valid state when said summed value reaches an lower limit; and means for latching said validity flag to an invalid state when it has been set to an invalid state and reset to a valid state a predetermined number of times.

4. The apparatus according to claim 1, wherein:

each said range/rate test circuit comprising means for generating a range/rate flag when said measured signal values are outside a predetermined range.

5. The apparatus according to claim 4 wherein:

each said range/rate test circuit comprising means for generating a range/rate flag when said measured signal's rate of change is outside a predetermined limit.

6. The apparatus according to claim 1 wherein:

each said comparison signal test circuit comprising means for generating a comparison flag when said measured signal values do not substantially equal the corresponding input signal.

\* \* \* \* \*